United States Patent [19]

Gellert

[11] 4,053,271

[45] Oct. 11, 1977

[54] VALVE-GATED INJECTION MOLDING MECHANISM

[76] Inventor: Jobst Ulrich Gellert, 11 Newton Road, Brampton, Ontario, Canada

[21] Appl. No.: 731,510

[22] Filed: Oct. 12, 1976

Related U.S. Application Data

[63] Continuation-in-part of Ser. No. 655,057, Feb. 4, 1976, Pat. No. 4,013,393.

[51] Int. Cl.$^2$ ............................................. B29F 1/00
[52] U.S. Cl. ........................... 425/562; 425/DIG. 227
[58] Field of Search .................. 425/245 R, 243, 247, 425/242 R, DIG. 224, DIG. 227

[56] References Cited

U.S. PATENT DOCUMENTS

| | | | |
|---|---|---|---|
| 2,928,125 | 3/1960 | Smucker et al. | 425/247 X |
| 3,113,346 | 12/1963 | Bright | 425/247 |
| 3,669,596 | 6/1972 | Sanory | 425/247 X |
| 3,677,682 | 7/1972 | Putkowski | 425/243 X |

FOREIGN PATENT DOCUMENTS

| | | | |
|---|---|---|---|
| 261,687 | 5/1970 | U.S.S.R. | 425/DIG. 227 |

*Primary Examiner*—Ronald J. Shore
*Assistant Examiner*—W. R. Briggs

*Attorney, Agent, or Firm*—George H. Riches and Associates

[57] ABSTRACT

This invention relates to an improved seal for injection molding mechanism. The lower nozzle portion of a heater with the reciprocal valve pin extending centrally therethrough extends downwardly to the gate in the mold. The generally cylindrical seal is horizontally located in an outward upward flare of the air space between the lower nozzle portion and the mold. The seal has a V-shaped lower surface which provides inner and outer circumferential lips which prevent the pressurized melt from flowing upward past the seal. The outer wall of the seal extends across the flare of the air space with only a portion of the outer lip abutting on the mold, thus substantially reducing heat loss from the heater through the seal to the cooled mold. The seal is located sufficiently far from the gate that the reduced heat loss through it is not from the direct gate area but sufficiently close that the melt which is injected into the remaining accessible air space is sufficiently small to be drawn into the cavity on each successive injection to avoid a color streaking problem. The outer lip is thicker than the inner lip to avoid it rupturing into the flare of the air space.

3 Claims, 2 Drawing Figures

VALVE-GATED INJECTION MOLDING MECHANISM

BACKGROUND OF THE INVENTION

This application is a continuation-in-part of application Ser. No. 655,057 filed Feb. 4, 1976 now U.S. Pat. No. 4,013,393.

This invention relates to an improved seal for valve-gated injection molding mechanism. In a typical multi-cavity arrangement, a heater is enclosed in the mold above each cavity and molten plastic material is supplied from a centrally located molding machine through hot runner passages which extend through a manifold spreader plate and the heaters to the cavities. A valve pin is reciprocated vertically in a cylindrical bore in each heater by a rocker arm actuated by an air operated piston. A lower tip of each valve pin extends through a lower nozzle portion of the heater to provide a valve in a gate in the mold leading to each cavity. Closing of the valve thus provided is controlled by controlling the air pressure to the pistons. Prior art mechanism of this general type are disclosed in the applicant's Canadian Pat. Nos. 840,892 issued May 5, 1970, 872,334 issued June 1, 1971, and 905,066 issued July 18, 1972.

The present invention disclosed herein in relation to one heater and cavity portion of a multi-cavity arrangement, may also apply to a single cavity arrangement. As is well known, heat transfer is of critical importance in mechanism of this type. In order to reduce undesirable heat transfer, the manifold spreader plate and the heaters containing the hot runner passages are generally isolated as much as structurally possible from the rest of the mold by a surrounding air space. In the past, the portion of this air space accessible from the valve and gate area has naturally filled with pressurized molten plastic material from the hot runner passage or has filled with a fitted machined high-temperature plastic such as glass fiber filled teflon. Apart from heat transfer considerations, this has the disadvantage of introducing partially decomposed and disclored plastic material into the cavity from time to time which results in color streaking following color changes. While metal seals may be used to seal the air space against the flow of molten plastic material, this has the disadvantage that excessive heat is lost from the heaters across the metal seals to the cooled molds.

SUMMARY OF THE INVENTION

Accordingly, it is an object of the present invention to at least partially overcome these disadvantages by providing an improved seal to be located in the air space between the heater and the mold in valve-gated injection molding mechanism.

To this end, in one of its aspects, the invention provides in an injection molding valve-gated mechanism having a vertical valve pin which reciprocates in a passage bore in a heater located in a mold to control flow of molten plastic from a molding machine to a cavity, the heater having a lower nozzle portion which is separated from the surrounding mold by a circumferential air space and through which the valve pin projects to provide a valve in a gate to the cavity, the improvement wherein a generally cylindrical seal having a vertical inner wall, a vertical outer wall and a lower surface is horizontally located in the air space between the lower nozzle portion of the heater and the mold, the seal being located where the air space flares outwardly upward, whereby the lower surface extends outwardly from the lower nozzle portion of the heater across the air space to the mold, the inner wall abuts against the lower nozzle portion of the heater and the outer wall extends upwardly from the mold across the air space to the lower nozzle portion of the heater, the lower surface having a uniform V-shaped cross-section formed by a first face extending diagonally outwardly upward from the inner surface and a second face extending diagonally inwardly upward from the outer surface, the lower surface forming an inner lip defined between the inner surface and the first diagonal face and an outer lip defined between the outer surface and the second diagonal face, only a portion of the outer lip abutting on the mold to reduce heat transfer through the seal from the lower nozzle portion of the heater to the mold.

Further objects and advantages of the invention will appear from the following description taken together with the accompanying drawings.

DESCRIPTION OF THE PREFERRED EMBODIMENT

Figure 1:
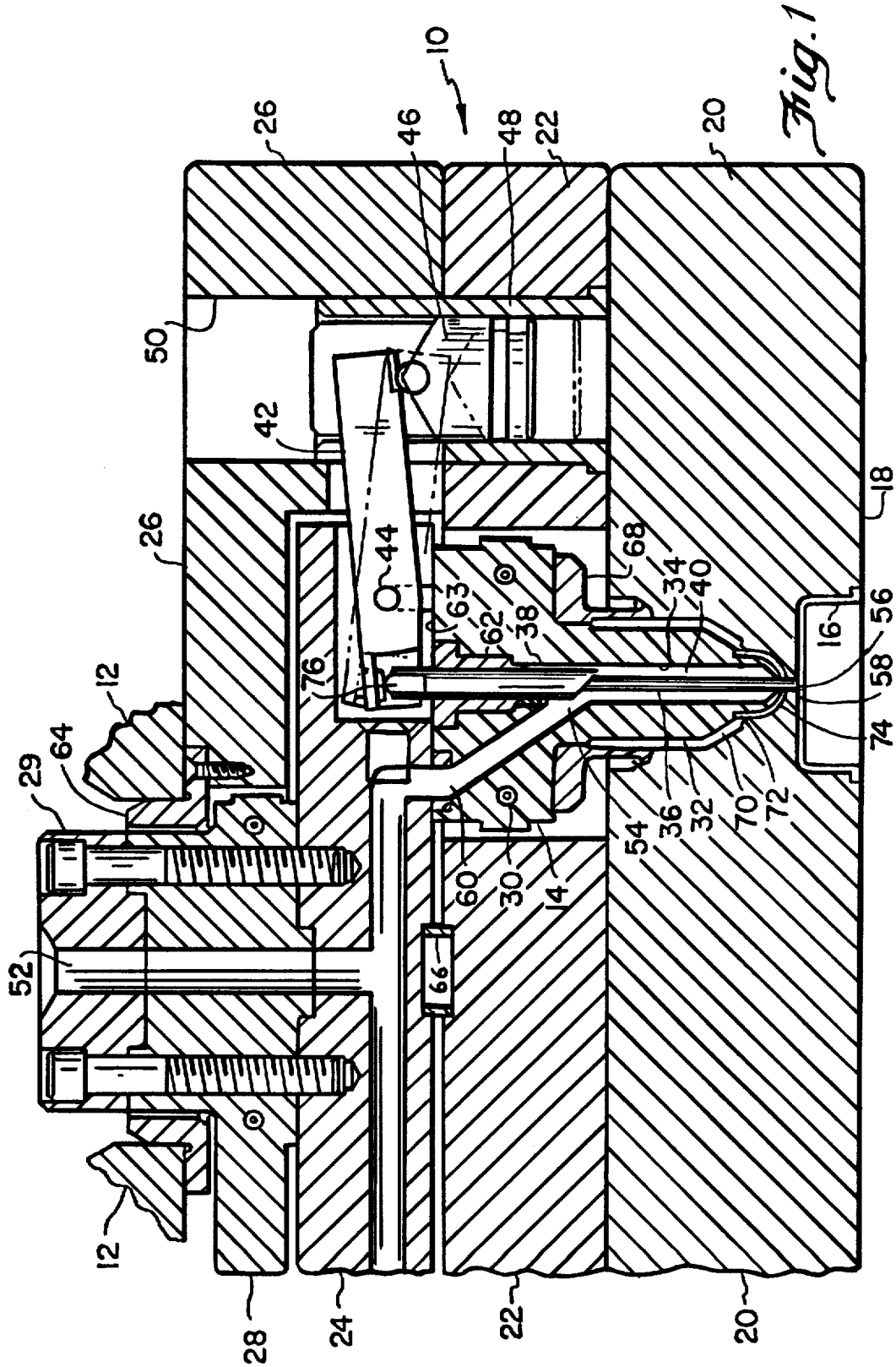
FIG. 1 is a partial vertical sectional view of a multi-cavity arrangement showing the seal according to a preferred embodiment of the invention.

Reference is first made to FIG. 1 which shows a portion of a multi-cavity mold 10 positioned beneath a molding machine 12 with a first heater 14 enclosed in the mold above cavity 16. Upward from the parting line 18, the mold 10 includes a cavity plate 20, a support plate 22, a manifold spreader plate 24, an annular collar 26, a second heater 28, and a nozzle seat plate 29 located directly beneath the molding machine 12. The first heater 14 has a circular electrical heater element 30, a lower nozzle portion 32 and a central vertical cylindrical bore 34. A vertical valve pin 36 having a larger upper portion 38 and a smaller lower portion 40 extends through the cylindrical bore 34.

Figure 2:
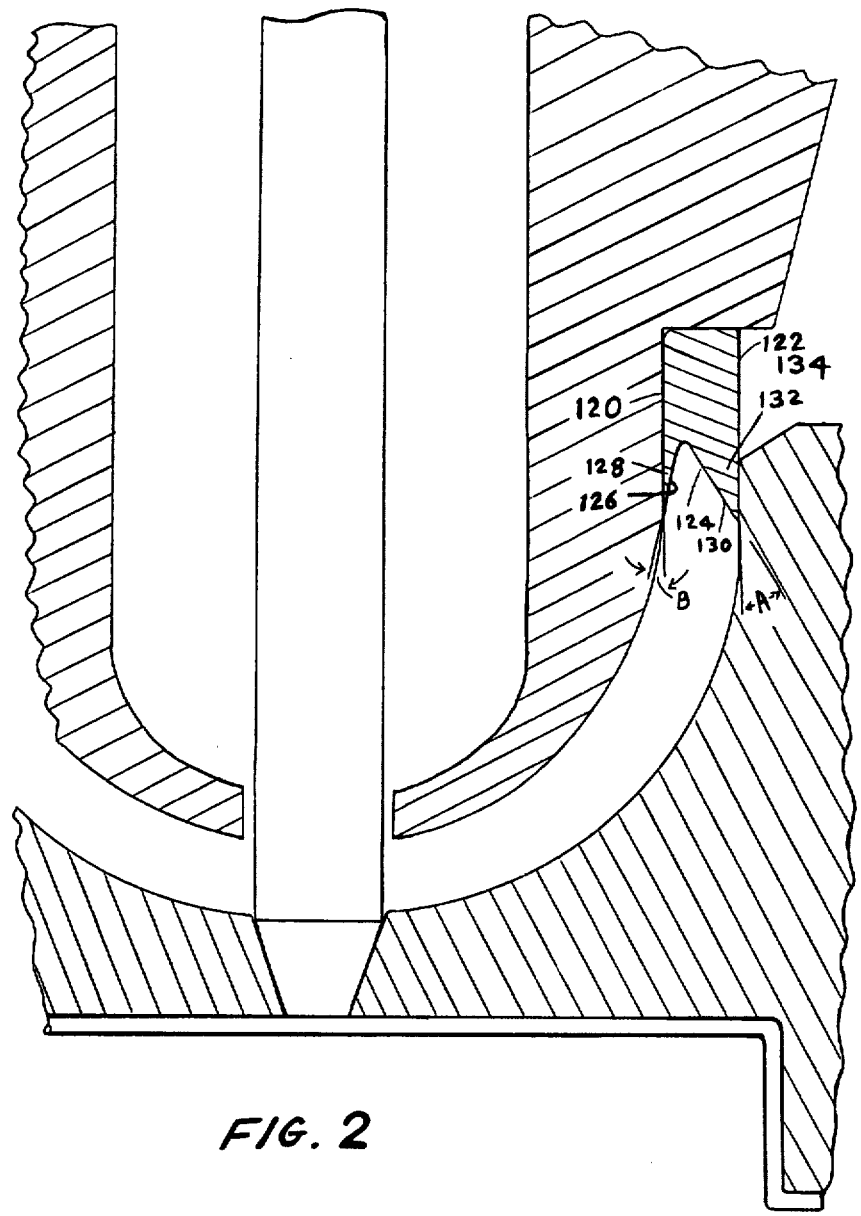
FIG. 2 is an enlargement of a portion of the sectional view seen in FIG. 1, showing a portion of the seal seen in FIG. 1 and a lower portion of the valve pin, the heater nozzle, and the surrounding portion of the mold.

In use, the valve pin 36 is reciprocated by a rocker arm 42 which pivots on a pivot pin 44 and is actuated by an air operated piston 46. Air pressure through air supply lines (not shown) drives piston 46 upward in a cylinder 48 located in a wall 50 in the annular collar 26 and the support plate 22. Molten plastic material is forced downward under pressure from the molding machine 12 through hot runner passage 52 which branches out through the manifold spreader plate 24 towards the different heaters and cavities. As may be seen in FIG. 1, the hot runner passage 52 angles downward through the heater 14 where it joins the bore 34 of the heater at junction 54. The molten plastic material passes on downward through the bore 34 around the smaller lower portion 40 of the valve pin 36 where it passes through gage 56 into the cavity 16. As may be seen in FIG. 2, a valve is provided by the frusto-conical lower tip 58 of valve pin 36 seating in the gate 56. The hot runner passage 52 enters the first heater 14 through collar 60 which projects slightly above the top surface of the heater 14 to provide sealing contact with the manifold spreader plate 24. The upper portion of the cylindrical bore 34 through the heater 14 extends through a bushing 62 which is centrally seated in the upper surface 63 of the heater 14.

Referring again to FIG. 1, the hot portions of the mold 10 through which the hot runner passage 52 extends are separated from the cooler portions of the mold 10 so far as structurally possible by air spaces to reduce heat transfer between them. For instance, mold locating ring 64 which is in contact with the molding machine 12 is spaced from the second heater 28, which is also spaced from the annular collar 26. The hot manifold spreader plate 24 is spaced and located from the cooler support plate 22 by cylindrical spacer 66. While it is important to reduce heat loss at these points, heat transfer characteristics are even more critical in the lower nozzle portion 32 of the heater 12. Heat is provided by the electrical heater element 30 as well as by the melt from the molding machine and in order to reach the gate area, this heat must be transferred downward a considerable distance without being lost to the cooler surrounding mold. It is critical that sufficient heat reach the gate area in order to eliminate solidification of the melt in this area just prior to closing to allow lesser seating pressures to be used and thus extend the operating life of the mechanism. Thus the lower nozzle portion 32 of the heater is formed of a beryllium-copper alloy to promote downward heat transfer. The heater 14, while being securely positioned relative to the cavity plate 20 by insulation bushing 68, is spaced from the surrounding support plate 22 and cavity plate 20 by air space 70. However, this arrangement has the disadvantage that the air space fills with melt which then solidifies and reduces the insulative characteristics of the space and as well results in colour streaking following colour changes. Thus it is desirable to provide a seal against the passage of melt through the air space to avoid the build-up of stale decomposing material, while at the same time not substantially increasing the amount of heat lost to the mold. The present invention provides a generally cylindrical seal 72 horizontally located in air space 70 between the lower nozzle portion 32 of the heater and the wall of the surrounding cavity plate 20. In the preferred embodiment the seal is formed of an alloy having over 90% titanium and lesser amounts of aluminum, vanadium and other elements. As may best be seen in FIG. 2, the seal 72 has a vertical inner wall 120, a vertical outer wall 122 and a V-shaped lower surface 124. The V-shaped lower surface 124 includes a first face 126 which extends diagonally outwardly upward from the inner surface at an angle of approximately 10° to form a circumferential inner lip 128 and a second face 130 which extends diagonally inwardly upward at an angle of approximately 30° to form a circumferential outer lip 132. The lips terminate at a machined radius finish of approximately 10 microns to avoid breakage of the leading edges. The seal is located at an outward flare 134 in the air space 70 which is sufficiently far from the gate area that the reduced heat loss through the seal 72 is not taken directly from the gate area and yet sufficiently close that the molten plastic material which is injected into the remaining accessible air space 74 is sufficiently small that it is drawn out into the cavity 16 with each injection to avoid the streaking problem. The lipped structure of the lower surface 124 of the seal 72 has been found to avoid the problem of pressure leakage past the seal which the applicant found made seals with a rectangular cross section ineffective. The upward pressure of the melt forces the lips against the lower nozzle portion 32 of the heater 14 and the cavity plate 20 respectively. The seal provided is of necessity a viscosity seal in that, for instance, the seal may be formed by tolerances of 0.002 inches when cold and expand 0.0015 inches at operating temperatures. As may be seen, the vertical inner wall 120 substantially abuts on the lower nozzle portion 32 of the heater 14, but the reduced heat transfer characteristic of the seal is provided by the fact that the vertical outer wall 122 extends across the outward flare 134 of the air space 70 with only a portion of the outer lip 132 abutting on the cavity plate 20 of the mold 10. The outer lip 132 is thicker than the inner lip 128 to allow minimized contact between the outer wall 122 and the cavity plate 20 while at the same time avoid the pressure of the melt breaking through the outer lip 132 into the outward flare 134 of the air space 70.

Although the disclosure describes and illustrates a preferred embodiment of the invention, it is to be understood that the invention is not restricted to this particular form of the mechanism. More particularly, it is apparent that the seal 72 may be formed of other material having suitable characteristics.

What I claim is:

1. In an injection molding valve-gated mechanism having a vertical valve pin which reciprocates in a passage bore in a heater located in a mold to control flow of molten plastic from a molding machine to a cavity, the heater having a lower nozzle portion which is separated from the surrounding mold by a circumferential air space and through which the valve pin projects to provide a valve in a gate to the cavity, the improvement comprising a generally cylindrical seal having a vertical inner wall, a vertical outer wall and a lower surface, said seal being horizontally located in the air space between the lower nozzle portion of the heater and the wall of a recess in the mold, said seal being located where the air space flares outwardly upward, the lower surface extending upwardly from the mold across the air space to an overhanging shoulder on lower nozzle portion of the heater, the lower surface having a uniform V-shaped cross section formed by a first face extending diagonally outwardly upward from the inner surface and a second face extending diagonally inwardly upward from the outer surface, the lower surface forming an inner lip defined between the inner surface and the first diagonal face and an outer lip defined between the outer surface and the second diagonal face, the seal being positioned so that only a portion of the outer lip abuts on the mold to reduce heat transfer through the seal from the lower nozzle portion of the heater to the mold.

2. The improvement claimed in claim 1 wherein the inner lip is substantially lesser in height and width than the outer lip.

3. The improvement claimed in claim 2 wherein the angle between the inner wall and the first diagonal face is approximately 10° and the angle between the outer wall and the second diagonal face is approximately 30°.

* * * * *